US009300383B2

(12) United States Patent
Kim et al.

(10) Patent No.: US 9,300,383 B2
(45) Date of Patent: Mar. 29, 2016

(54) PRECODER SELECTION METHOD AND APPARATUS FOR PERFORMING HYBRID BEAMFORMING IN WIRELESS COMMUNICATION SYSTEM

(71) Applicant: Samsung Electronics Co., Ltd., Gyeonggi-do (KR)

(72) Inventors: Tae-Young Kim, Gyeonggi-do (KR); Chan-Hong Kim, Gyeonggi-do (KR); Ji-Yun Seol, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/268,930

(22) Filed: May 2, 2014

(65) Prior Publication Data

US 2014/0355707 A1 Dec. 4, 2014

(30) Foreign Application Priority Data

May 2, 2013 (KR) ........................ 10-2013-0049654

(51) Int. Cl.
*H04B 7/06* (2006.01)
*H04L 1/06* (2006.01)
*H04B 7/04* (2006.01)

(52) U.S. Cl.
CPC ............ *H04B 7/0617* (2013.01); *H04B 7/0456* (2013.01); *H04B 7/0469* (2013.01); *H04B 7/0695* (2013.01); *H04L 1/06* (2013.01); *H04B 7/0639* (2013.01)

(58) Field of Classification Search
None
See application file for complete search history.

(56) References Cited

U.S. PATENT DOCUMENTS

| | | | |
|---|---|---|---|
| 8,548,095 B2 | 10/2013 | Park et al. | |
| 2008/0165875 A1* | 7/2008 | Mundarath | H04B 7/0417 375/262 |
| 2011/0194638 A1* | 8/2011 | Erell et al. | 375/267 |
| 2012/0069926 A1 | 3/2012 | Park et al. | |
| 2012/0230380 A1 | 9/2012 | Keusgen et al. | |
| 2013/0039401 A1 | 2/2013 | Han et al. | |
| 2013/0045690 A1 | 2/2013 | Seol et al. | |
| 2013/0072243 A1 | 3/2013 | Yu et al. | |
| 2014/0003481 A1 | 1/2014 | Keusgen et al. | |

FOREIGN PATENT DOCUMENTS

KR 10-2008-0090237 10/2008

OTHER PUBLICATIONS

International Search Report dated Aug. 21, 2014 in connection with International Patent Application No. PCT/KR2014/003961; 3 pages.
Written Opinion of International Searching Authority dated _Aug. 21, 2014 in connection with International Patent Application No. PCT/KR2014/003961; 5 pages.

* cited by examiner

*Primary Examiner* — Vineeta Panwalkar

(57) ABSTRACT

One or more embodiments provides a precoder selection method for performing hybrid beamforming in a wireless communication system. The method includes selecting a predetermined number of candidate transmit beams using a signal strength received through each of first combinations with receive beams that can be mapped to each transmit beam of each of transmit antennas mounted on a transmitter. The method also includes selecting a precoder using signal strength received through each of second combinations with receive beams that can be mapped to each of the candidate transmit beams.

18 Claims, 7 Drawing Sheets

START
DETERMINE ANALOG TX/RX BEAMS FOR EACH OF TX ARRAY ANTENNAS MOUNTED ON TRANSMITTER — 500
GENERATE ALL POSSIBLE FIRST CANDIDATE ANALOG BEAM COMBINATIONS EACH INCLUDING DETERMINED ANALOG TX BEAM AND ANALOG RX BEAM FOR EACH TX ARRAY ANTENNA — 505
MEASURE AND STORE RSS OF CHANNEL MEASUREMENT REFERENCE SIGNAL RECEIVED FOR EACH FIRST CANDIDATE ANALOG BEAM COMBINATION — 510
RSS FOR EACH OF ALL FIRST CANDIDATE ANALOG BEAM COMBINATIONS IS STORED? — 515
NO
YES
SELECT PREDETERMINED NUMBER 'BEST-K' OF ANALOG TX BEAMS HAVING RSS VALUE IN ORDER OF HIGH RSS MEASUREMENT VALUE — 520
FIRST COMPARISON PROCESS (SELECT K ANALOG BEAMS)
A

A
GENERATE SECOND CANDIDATE ANALOG BEAM COMBINATION BY MAPPING ALL POSSIBLE ANALOG RX BEAMS TO EACH OF BEST-K ANALOG TX BEAMS — 525
RECEIVE CHANNEL MEASUREMENT REFERENCE SIGNAL RECEIVED FOR EACH SECOND CANDIDATE ANALOG BEAM COMBINATION AND CALCULATE AND STORE $\|h_e\|^2$ BASED ON EQUATION (11) FOR EACH CHANNEL MEASUREMENT REFERENCE SIGNAL — 530
CALCULATION OF $\|h_e\|^2$ FOR ALL SECOND CANDIDATE ANALOG BEAM COMBINATIONS IS COMPLETED? — 535
NO
YES
SELECT MAXIMUM VALUE BY COMPARING $\|h_e\|^2$ VALUES OF ALL SECOND CANDIDATE ANALOG BEAM COMBINATIONS — 540
SELECT OPTIMAL DIGITAL PRECODER MEETING EQUATION (12) BASED ON MAXIMUM VALUE OF $\|h_e\|^2$ — 545
END
SECOND COMPARISON PROCESS (SELECT OPTIMAL ANALOG TX/RX BEAMS FOR EACH TX/RX ARRAY ANTENNA)

PRECODER SELECTION METHOD AND APPARATUS FOR PERFORMING HYBRID BEAMFORMING IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on May 2, 2013 and assigned Serial No. 10-2013-0049654, the entire disclosure of which is incorporated herein by reference.

TECHNICAL FIELD

The present disclosure relates to a precoder selection method and apparatus for performing hybrid beamforming in a wireless communication system.

BACKGROUND

Wireless communication systems have evolved to support a higher data rate in order to meet the increasing demand for wireless data traffic. The current wireless communication systems have pursued the development of technology for mainly improving the spectral efficiency in order to increase the data rate, but the increasing demand for wireless data traffic may no longer be met only with the development of technology for improving the spectral efficiency.

In order to solve these problems, the way to use a very wide frequency band may be considered. However, in the frequency band (<5 GHz) used in the current mobile cellular communication system, it is difficult to secure a broader frequency band in reality. Therefore, a broadband frequency could be ensured in a frequency band higher than the current frequency band.

Undesirably, however, as the transmission frequency for wireless communication is higher, the propagation path loss may also be higher. Due to the increase in propagation path loss, the range of radio waves may be shorter, causing a reduction in service coverage. Beamforming technology has been proposed as one of the important technologies for mitigating the propagation path loss and increasing the range.

An analog beamforming scheme, one of the beamforming technologies, is a method in which transmit beamforming used in a transmitter concentrates a signal transmitted from each antenna in a specific direction using a plurality of antennas. To this end, an array antenna may be used, in which a plurality of antenna elements are combined. With the use of the transmit beamforming, the range of radio waves for signals may be increased, and almost no signal may be transmitted in directions other than the direction, contributing to a significant decrease in interference to other users. Similarly, even a receiver may perform receive beamforming using a receive array antenna, and the receive beamforming may also concentrate reception of radio waves in a specific direction to increase the sensitivity of a signal received in the direction, and exclude signals received in directions other than the direction, from the received signal, thereby blocking interference signals.

As the transmission frequency is higher, the wavelength of radio waves is shorter. Thus, if antennas are configured at intervals of, for example, half wavelength, an array antenna may be configured with more antenna elements in the same area. Therefore, the communication system operating in a high-frequency band may easily apply the beamforming technology since the system can obtain higher antenna gain, compared with a system that uses the beamforming technology in a low-frequency band.

In this beamforming technology, in order to obtain higher antenna gain, hybrid beamforming may be used, which is given by combining analog beamforming technology with digital precoding technology that is used to obtain the effect of the high data rate in the existing multi-antenna system. In this embodiment, when one or more analog beams are formed by forming beams through analog beamforming, digital precoding may be applied, which is similar to that applied in the baseband in the existing multi-antenna system, so high-reliability signals may be received or high system capacity may be expected. Using the hybrid beamforming may ensure higher performance compared to using only one of analog beamforming and digital precoding, but may cause an increase in implementation complexity.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a precoder selection method and apparatus for performing hybrid beamforming in a wireless communication system.

In accordance with an aspect of the present disclosure, an embodiment provides a precoder selection method for performing hybrid beamforming in a wireless communication system. The method includes selecting a predetermined number of candidate transmit beams using a signal strength received through each of first combinations with receive beams that can be mapped to each transmit beam of each of transmit antennas mounted on a transmitter. The method also includes selecting a precoder using signal strength received through each of second combinations with receive beams that can be mapped to each of the candidate transmit beams.

In accordance with another aspect of the present disclosure, an embodiment provides a method for performing communication using hybrid beamforming in a wireless communication system. The method includes, upon receiving a codebook index from a receiver, obtaining a precoder corresponding to the codebook index in a pre-stored codebook including indexes corresponding to an angle between different transmit and receive antennas. The method also includes transmitting data using the precoder.

In accordance with yet another aspect of the present disclosure, an embodiment provides a precoder selection apparatus for performing hybrid beamforming in a wireless communication system. The apparatus includes a controller configured to select a predetermined number of candidate transmit beams using a signal strength received through each of first combinations with receive beams that can be mapped to each transmit beam of each of transmit antennas mounted on a transmitter. The controller is also configured to select a precoder using signal strength received through each of second combinations with receive beams that can be mapped to each of the candidate transmit beams.

In accordance with yet another aspect of the present disclosure, an embodiment provides a transmission apparatus for performing communication using hybrid beamforming in a wireless communication system. The apparatus includes a controller configured, upon receiving a codebook index from a receiver, to obtain a precoder corresponding to the codebook index in a pre-stored codebook including indexes corresponding to an angle between different transmit and receive antennas. The apparatus also includes a transceiver, under control of the controller, configured to perform data communication using the precoder.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 7, as discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. The following description with reference to the accompanying drawings is provided to assist in a comprehensive understanding of example embodiments of the disclosure as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of example embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although an embodiment of the present disclosure will be described with reference to a communication system using a millimeter wave frequency band, the embodiment of the present disclosure may be applied to any communication system other than the communication system that uses a millimeter wave frequency band.

Figure 1:
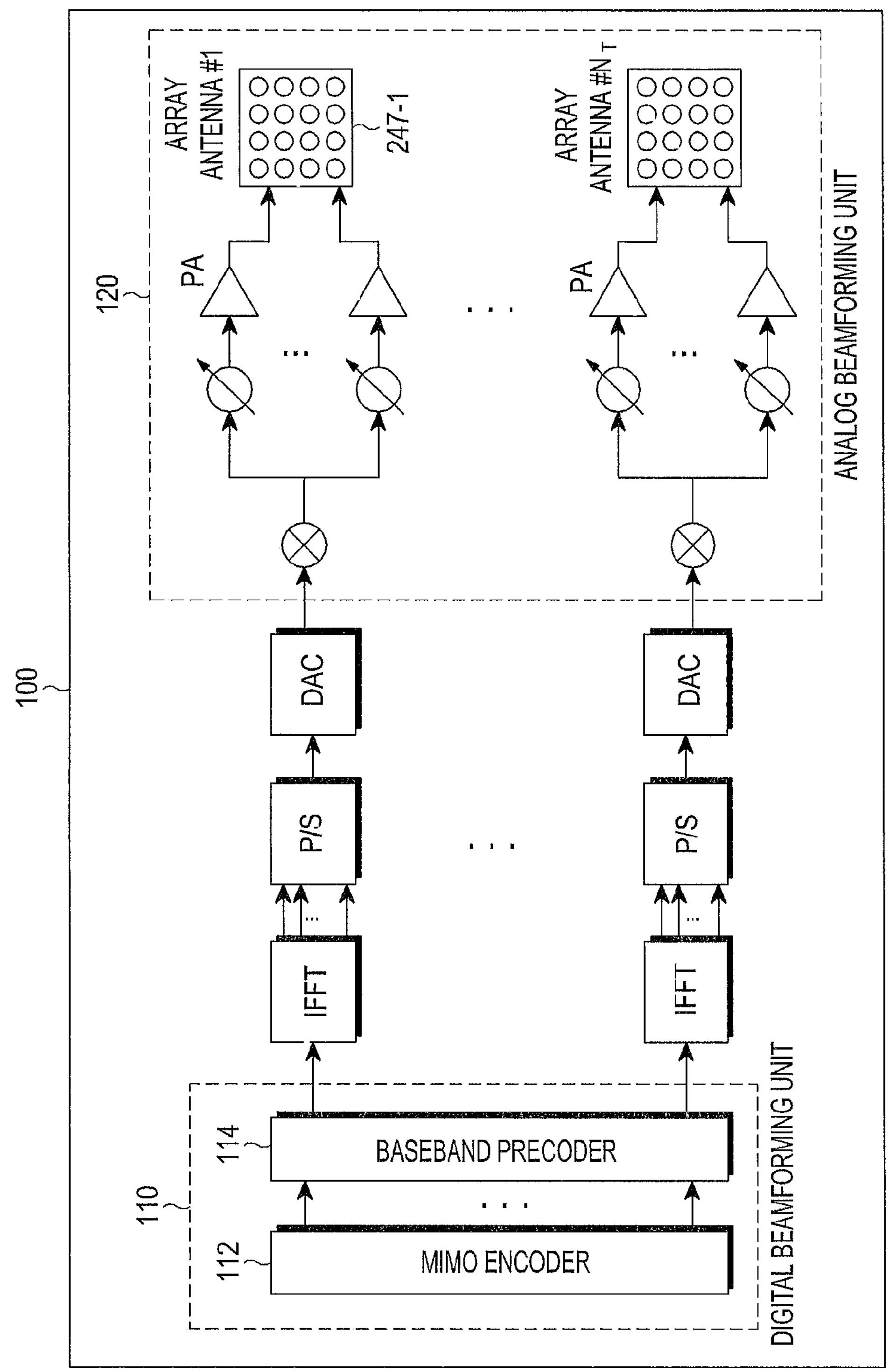
FIG. 1 illustrates a configuration of a wireless communication system to which hybrid beamforming is applied.

FIG. 1 illustrates a configuration of a transmitter to which hybrid beamforming is applied.

Referring to FIG. 1, a transmitter 100 may include a digital beamforming unit 110 and an analog beamforming unit 120. The digital beamforming unit 110 and the analog beamforming unit 120 may be connected to each other by wireless chains corresponding to NT array antennas. The digital beamforming unit 1110 may include, for example, a Multiple Input Multiple Output (MIMO) encoder 112 and a baseband precoder 114. A wireless chain corresponding to each of NT array antennas may include, for example, an Inverse Fast Fourier Transform (IFFT) block, a Parallel/Series (P/S) converter, and a Digital-to-Analog Converter (DAC). The analog beamforming unit 120 may include, for example, mixers and Power Amplifiers (PAs) that are connected to their associated antenna elements located on the horizontal side of a relevant array antenna.

Each of the NT array antennas may transmit data via antenna elements by applying beamforming. Each array antenna may form an analog beam in all directions in the service coverage of the transmitter 100, and the direction of the analog beam may be determined in advance. Accordingly, the transmitter 100 may transmit channel measurement reference signals, to which analog beams that are predetermined for their associated antenna elements of each of the array antennas are applied, to all terminals located in the service coverage. Then, all the terminals may select an analog beam appropriate for themselves based on the received channel measurement reference signals.

In the structure of the transmitter, which is illustrated in FIG. 1 and to which hybrid beamforming is applied, an optimal analog beam could be selected for each array antenna since a plurality of analog beams may be formed using a plurality of array antennas. In addition to the plurality of analog beams, digital precoding may be applied by means of the baseband precoder 114 in the baseband, since the plurality of array antennas are used. In an embodiment, a precoding vector could be determined in an NT-dimensional digital codebook corresponding to the total number of array antennas. To this end, a terminal may select and determine appropriate analog transmit/receive beams and digital precoding vector depending on the channel environment and use conditions, using the channel measurement reference signal transmitted from a base station (or a transmitter). Since the present disclosure aims at improvement of spatial diversity gain, it will be assumed in an embodiment of the present disclosure that one user (or one terminal) transmits one data stream. Accordingly, it will be assumed that a reference signal to which hybrid beamforming is applied by the transmitter 100 in FIG. 1 is received at the terminal. Then, the received signal 'y' that the terminal has received may be written as Equation (1) below.

$$y=V^T H W p_i s+n \tag{1}$$

where 'H' denotes a channel matrix having a size of ($N_R^{RF}$ $N_R \times N_T^{RF}$ $N_T$), and 'W' and 'V' denote a transmit analog beamforming matrix having a size of ($N_T^{RF}$ $N_T \times N_T$) and a receive analog beamforming matrix having a size of ($N_R^{RF}$ $N_R \times N_R$), respectively, both of which are determined depending on the transmitter in FIG. 1. Here, $N_R^{RF}$ and denote the total number of array antennas mounted on the terminal (e.g., receiver), and the number of antenna elements of an array antenna, respectively. In addition, $p_i$ denotes a digital precoding vector applied to the signal that is transmitted via $N_T$ array antennas, and may mean an i-th vector among the vectors constituting a predetermined digital codebook. Further, 's' denotes a data symbol transmitted, 'n' denotes a noise signal, and $(\cdot)^T$ means computation of a transpose matrix.

The transmit analog beamforming matrix W and the receive analog beamforming matrix V may be written as Equations (2) and (3) below, respectively.

$$W=\text{diag}\{\vec{a}(\theta_1), \ldots, \vec{a}(\theta_{N_T})\} \tag{2}$$

$$V=\text{diag}\{\vec{a}(\phi_1), \ldots, \vec{a}(\phi_{N_R})\} \tag{3}$$

where diag{ . . . } denotes a function of generating a diagonal matrix by arranging vectors/matrixes given in the function in the form of a diagonal matrix. In addition, $\theta_k$ and $\Phi_k$ denote directions of analog beams preferred by a transmitter and a receiver, respectively, and $N_T$ and $N_R$ denote the numbers of wireless chains of the transmitter and the receiver, respectively. The possible number of wireless chains of the transmitter may be different from the possible number of wireless chains of the receiver. For example, in the example of the transmitter, its beamforming system may be configured to include a larger number of digital chains taking into account the size of the transmitter. Alternatively, since the receiver is smaller in size than the transmitter, its beamforming system may be configured to include a less number of digital chains, for example, only one digital chain, taking the small size into account. For convenience of description, it will be assumed that in Equations (2) and (3), data is transmitted via $N_T$ analog transmit beams and data is received using $N_R$ analog receive beams. To this end, an optimal transmit beam and an optimal receive beam could be determined in advance for each antenna of the transmitter and each antenna of the receiver.

In Equation (2), $\bar{a}(\theta)$ denotes a steering vector, which is an analog beamforming vector for forming a beam to concentrate transmit/receive signals in a specific direction θ, and which may be differently defined depending on the transmission scheme or structure of the array antenna used. For example, if a linear array antenna is assumed to be used as the array antenna, a steering vector $\bar{a}(\theta)$ may be defined as Equation (4) below.

$$\bar{a}(\theta)=\left[\begin{array}{llll}1 & e^{j\frac{2\pi}{\lambda}d\sin(\theta)} & \ldots & e^{j\frac{2\pi}{\lambda}d(N-1)\sin(\theta)}\end{array}\right]^T \tag{4}$$

where λ denotes a wavelength corresponding to the center frequency used, 'd' denotes the distance between adjacent antenna elements, and 'N' denotes the total number of antenna elements used for analog beamforming. In the example of Equations (2) and (3), a value of N may be set as $N_T^{RF}$ and $N_R^{RF}$, respectively, and analog transmit/receive beams may be formed using their associated numbers of antenna elements.

In an embodiment, in order to apply hybrid beamforming between a transmitter and a receiver, a process is used, which is a process of selecting optimal analog transmit/receive beams and an optimal digital precoding vector, which are suitable for the channel environment between the transmitter and the receiver. In an embodiment, it will be assumed that as illustrated in FIG. 1, the transmitter has a plurality of array antennas and a plurality of beams caused by the array antennas, and the receiver also has the same structure as that of the transmitter. Then, an optimal receive beam could be selected for each of analog transmit beams for each of all array antennas. To this end, $V^T HW$ in Equation (1) may be changed to a virtual channel matrix G as written in Equation (5) below.

$$G(\Theta_T,\Phi_R)=V^T HW=[g_1 \ldots g_{N_T}] \tag{5}$$

where $\Theta_T=\{\theta_1, \ldots, \theta_{N_T}\}$ denotes directions of preferred beams among the analog transmit beams, and $\Phi_R=\{\phi_1, \ldots, \phi_{N_R}\}$ denotes directions of preferred beams among the analog receive beams. The characteristics of the virtual channel matrix G may be adjusted depending on the method of selecting preferred transmit/receive beams from among the analog transmit/receive beams. Therefore, the virtual channel matrix G may be expressed as a function of $\Theta_T$ and $\Phi_R$, which is a combination of selected analog transmit/receive beams, and the system capacity may be maximized by generating the virtual channel matrix G by selecting appropriate analog transmit/receive beams.

A data symbol 's', which is transmitted according to Equation (1), may be transmitted to the receiver through the virtual channel matrix G after it is digital-precoded with a digital precoding vector $p_i$. The digital precoding vector may be defined as, for example, $p_i=[p_{i,1} \ldots p_{i,N_T}]^T$. Here, $p_i$ represents an i-th column vector of a digital codebook used in the system, and the applied precoding vectors may be changed depending on the digital codebook that is designed in advance by the receiver. For example, the codebook used in an embodiment of the present disclosure will be assumed as a codebook having a Discrete Fourier Transform (DFT)-based constant modulo (e.g., antenna-specific constant amplitude). The codebook according to an embodiment of the present disclosure may include codebook indexes corresponding to an angle between the transmit/receive beams.

Accordingly, values of elements in the precoding vector may be defined as Equation (6) below.

$$p_{i,k} = \frac{1}{\sqrt{N_T}} ej\psi_{i,k}, \quad \text{where } p_{i,1} = 1 \ \& k \neq 1 \tag{6}$$

Equation (1) may be rewritten as Equation (7) below, using Equations (5) and (6).

$$y = \left( \sum_{t=1}^{N_T} p_{i,t} g_t \right) \cdot s + n \tag{7}$$

where $E\{\|s\|^2\}=P$, and if $$h_e = \left( \sum_{i=1}^{N_T} p_{i,t} g_t \right),$$

a Signal-to-Noise Ratio (SNR) or Capacity value of a received signal may be calculated using Equation (8) below.

$$SNR = \frac{\|h_e\|^2 P}{\sigma_n^2} \text{ or Capacity} = \log_2\left(1 + \frac{\|h_e\|^2 P}{\sigma_n^2}\right) \tag{8}$$

As a result, in order to perform hybrid beamforming, analog transmit/receive beams and a digital precoding vector could be determined, which satisfy Equation (9) below (e.g., satisfy the maximum value among the SNR values or the maximum value among the Capacity values).

$$\max SNR = \max \text{Capacity} = \max_{\Theta_T, \Theta_R, PMI} \|h_e\|^2 \tag{9}$$

In an embodiment of the present disclosure, two types of hybrid beamforming algorithms may be considered, which determine analog transmit/receive beams and a digital precoding vector, which satisfy the maximum value among the SNR or Capacity values satisfying Equation (8). Although it will be assumed herein that the maximum value among the SNR or Capacity values is used as an example of a metric for determining analog transmit/receive beams and a digital precoding vector, sum-rate capacity and the like may be further considered as the metric in addition to the maximum value among the SNR or Capacity values in an embodiment of the present disclosure.

In a joint hybrid beamforming algorithm, a combination satisfying the maximum value among the SNR (or Capacity) values may be determined by calculating an SNR (or Capacity) value for each of all possible combinations of all analog transmit beams of a transmitter, all analog receive beams of a receiver, and all digital precoding vectors.

Figure 2:
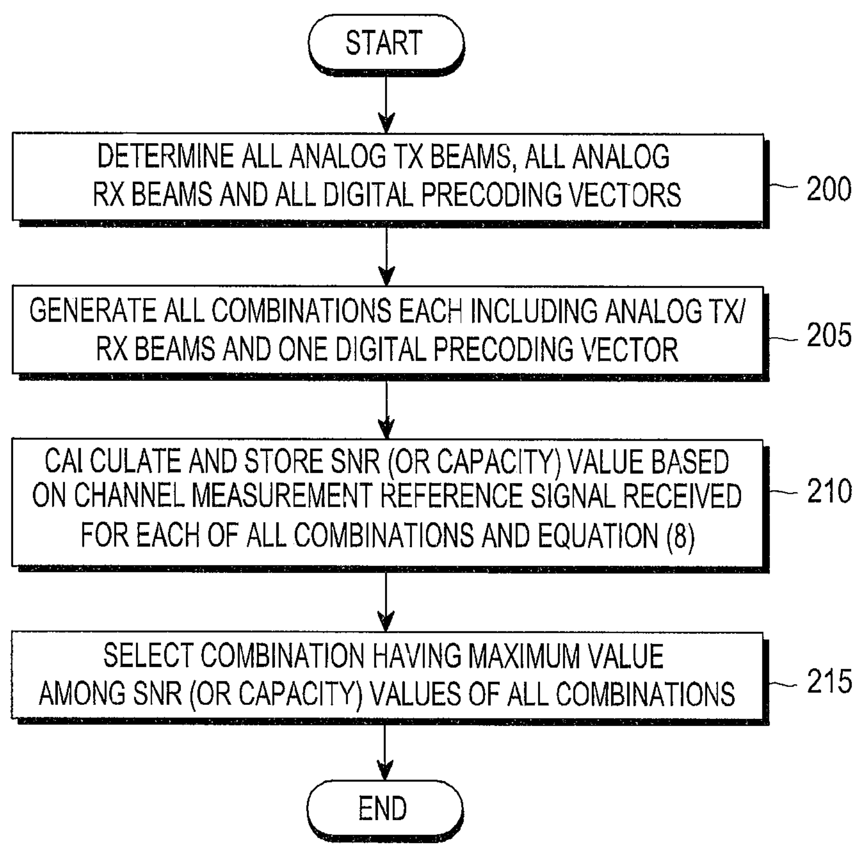
FIG. 2 illustrates a process of a joint hybrid beamforming algorithm.

FIG. 2 illustrates a process of a joint hybrid beamforming algorithm.

Referring to FIG. 2, in operation 200, a receiver may determine all analog transmit beams of a transmitter, all analog receive beams thereof, and all of predetermined digital precoding vectors. For example, it will be assumed that if the transmitter has $N_T$ transmit array antennas, $M_T$ analog transmit beams may be formed for each transmit array antenna; if the receiver has $N_R$ receive array antennas, $M_R$ analog receive beams may be formed for each receive array antenna; and a total of $K_{CB}$ digital precoding vectors are set. It will also be assumed that the receiver has obtained in advance, from control information of the transmitter, information about the transmit array antennas and the analog transmit beams. In operation 205, the receiver may generate all possible combinations each including analog transmit/receive beams and a digital precoding vector depending on the determined all analog transmit/receive beams and the determined all digital precoding vectors. In this embodiment, the total number of all possible combinations is $M_T^{N_T} \times M_R^{N_R} \times K_{CB}$. In operation 210, the receiver may calculate and store an SNR (or Capacity) value in accordance with Equation (8) using a channel measurement reference signal received for each of all the combinations. After determining the calculation of an SNR (or Capacity) value for each of all the combinations, the receiver may determine the maximum value among the stored SNR (or Capacity) values and select a combination having the maximum value, in operation 215.

First, the joint hybrid beamforming algorithm illustrated in FIG. 2 has very high calculation complexity due to its process of calculating SNR (or Capacity) values for all possible combinations and based thereon, selecting a combination having the maximum value among the SNR (or Capacity) values. However, if the combinations selected in accordance with the joint hybrid beamforming algorithm are used, very high performance may be achieved because all the possible combinations are considered.

Next, a separate hybrid beamforming algorithm corresponds to a method of sequentially performing an operation of selecting analog transmit/receive beams and an operation of selecting a digital precoding vector in order to reduce the complexity of the joint hybrid beamforming algorithm. In an embodiment, in the operation of selecting analog transmit/receive beams, a Received Signal Strength (RSS) may be compared and determined depending on an analog transmit/receive beam combination (hereinafter referred to as an 'analog beam combination') for each of all transmit array antennas, using the channel measurement reference signal. Analog beam combinations having an RSS higher than or equal to a predetermined RSS threshold may be selected from among all the analog beam combinations, RSSs of which have been measured, and then virtual channel matrixes G may be formed with transmit/receive beams constituting the selected analog beam combinations. If each of digital precoding vectors included in a digital codebook that is determined in advance for the virtual channel matrixes G is used, an SNR (or Capacity) value may be calculated in accordance with Equation (8). Thereafter, a digital precoding vector having the maximum SNR (or Capacity) value among the calculated SNR (or Capacity) values may be selected as an optimal digital precoding vector, and hybrid beamforming may be performed based on the virtual channel matrix G.

Figure 3:
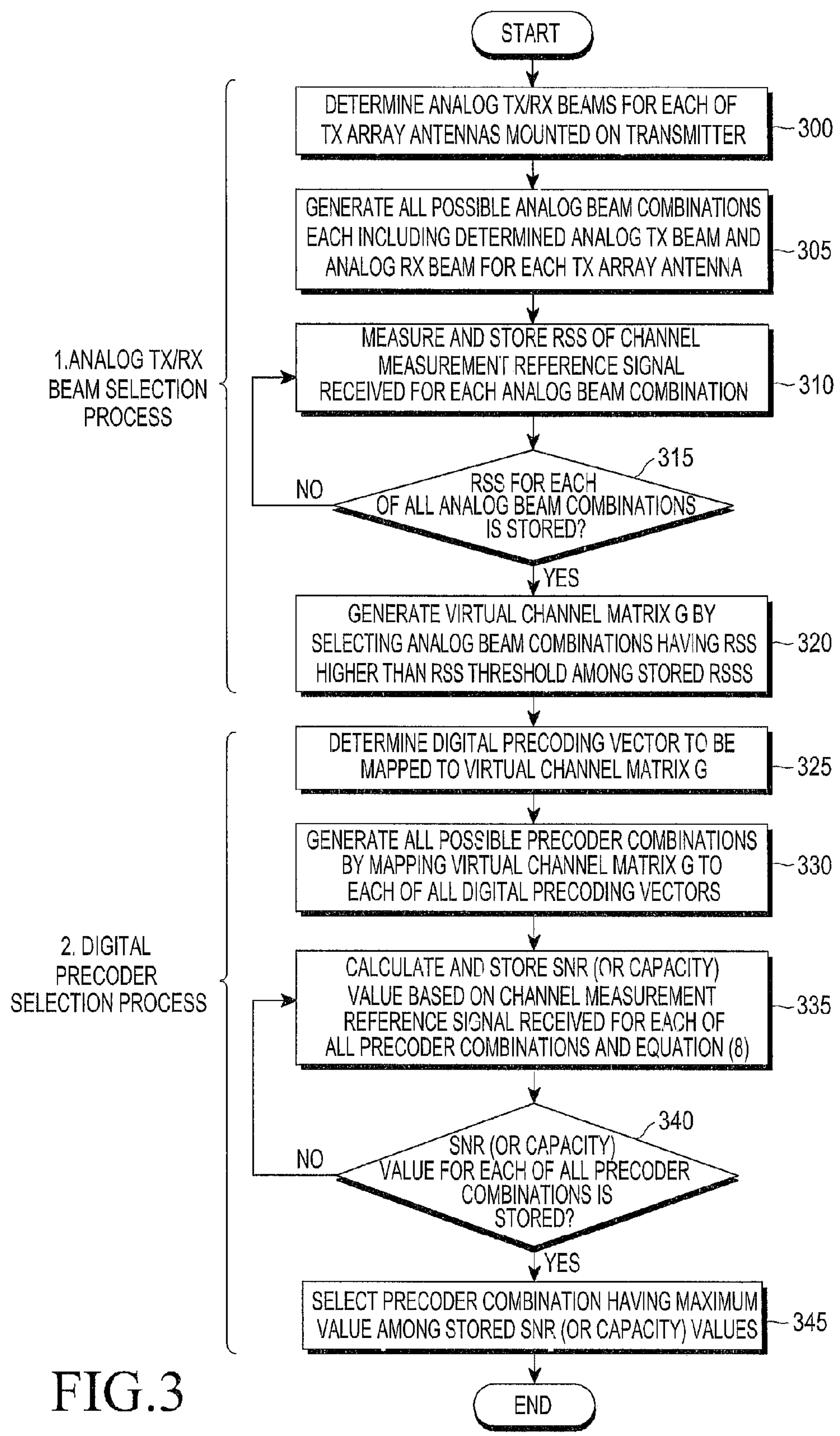
FIG. 3 illustrates a process of a separate hybrid beamforming algorithm.

FIG. 3 illustrates a process of a separate hybrid beamforming algorithm.

Referring to FIG. 3, the separate hybrid beamforming algorithm may include a process (operations 300 to 320) of selecting analog transmit/receive beams and a process (operations 325 to 345) of selecting a digital precoder.

In operation 300, a receiver may determine analog transmit beams for each of transmit array antennas mounted on a transmitter, and analog receive beams that can be mapped to the analog transmit beams. For example, a system will be considered, which includes $N_T$ transmit array antennas, $M_T$ analog transmit beams for each transmit array antenna, $N_R$ receive array antennas, $M_R$ analog receive beams for each receive array antenna, and $K_{CB}$ digital precoding vectors. It will also be assumed that the receiver has obtained in advance, from control information of the transmitter, information about the transmit array antennas and the analog transmit beams.

In operation 305, the receiver may generate a possible analog beam combination by mapping an analog receive beam to the determined analog transmit beam for each transmit array antenna. In this embodiment, in the separate hybrid beamforming algorithm, the receiver may generate a total of $N_\tau \times M_\tau \times M_R^{N_R}$ analog beam combinations and perform RSS measurement thereon. As a result, it can be appreciated that the RSS measurement on analog beam combinations in the separate hybrid beamforming algorithm is much lower in complexity than the SNR (or Capacity) calculation in the joint hybrid beamforming algorithm.

In operation 310, the receiver may measure and store an RSS of a channel measurement reference signal received for each of all the analog beam combinations. In operation 315, the receiver may determine whether an RSS for each of all the analog beam combinations has been stored. If it is determined that an RSS for each of all the analog beam combinations has not been stored yet, the receiver may return to operation 310 and measure an RSS of a channel measurement reference signal until RSSs for all analog beam combinations have been stored. Accordingly, the separate hybrid beamforming algorithm may perform RSS measurement on a total of $N_\tau \times M_\tau \times M_R^{N_R}$ analog beam combinations, which is much lower in complexity than SNR (or Capacity) calculation by the joint hybrid beamforming algorithm. Alternatively, if it is determined that RSSs for all the analog beam combinations have been stored, the receiver may select, in operation 320, analog beam combinations having an RSS higher than or equal to an RSS threshold from among the analog beam combinations, RSSs of which have been stored. The number of selected analog beam combinations may be one or more. The receiver may generate virtual channel matrixes G with analog transmit/receive beams constituting the selected analog beam combinations.

In operation 325, the receiver may determine $K_{CB}$ digital precoding vectors to be mapped to the virtual channel matrixes G. In operation 330, the receiver may generate all possible precoder combinations by mapping each of all the determined digital precoding vectors to the virtual channel matrixes G. In operation 335, the receiver may receive a channel measurement reference signal for each of all the precoder combinations, and calculate and store an SNR (or Capacity) value in accordance with Equation (8). In operation 340, the receiver may determine whether an SNR (or Capacity) value has been calculated for each of all the precoder combinations. If it is determined that an SNR (or Capacity) value has not been calculated for each of all the precoder combinations and each of the virtual channel matrixes G, the receiver may return to operation 355 and calculate an SNR (or Capacity) value of a channel measurement reference signal until SNR (or Capacity) values for all the precoder combinations and the virtual channel matrixes G have been calculated. Alternatively, if it is determined that an SNR (or Capacity) value has been calculated for each of all the precoder combinations and each of the virtual channel matrixes G, the receiver may select an optimal precoder combination having the maximum value among the stored SNR (or Capacity) values in operation 345. Thereafter, the receiver may perform hybrid beamforming based on the digital precoding vector corresponding to the optimal precoder combination and the virtual channel matrixes G.

Figure 4:
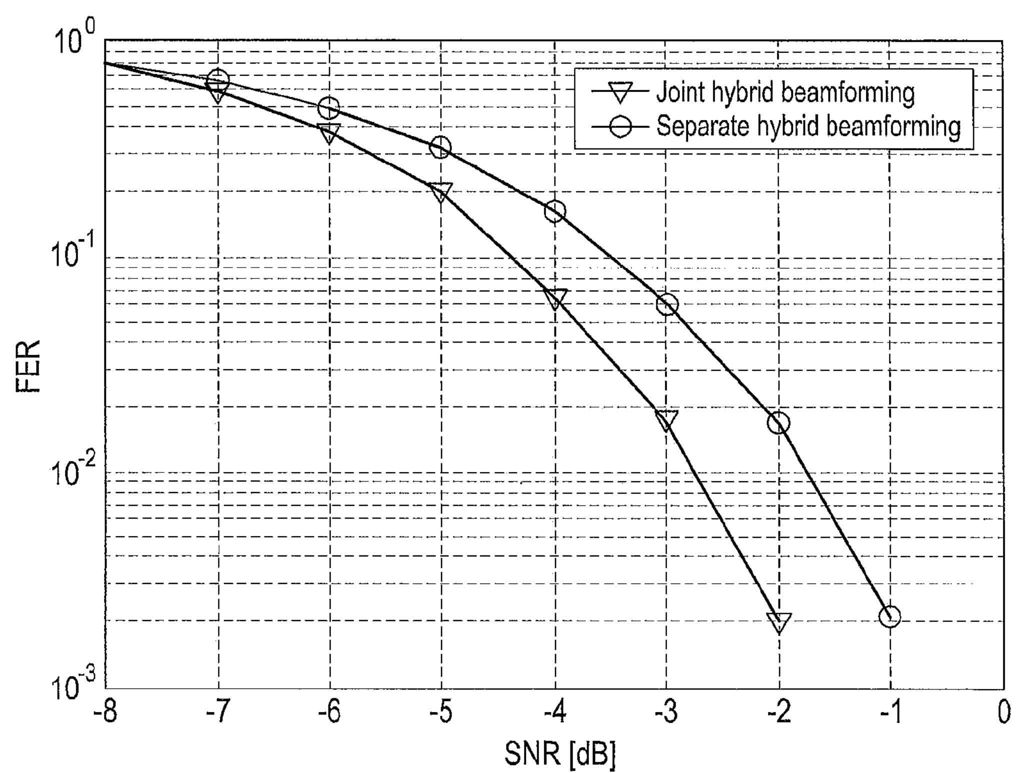
FIG. 4 illustrates comparison in performance between the joint hybrid beamforming algorithm and the separate hybrid beamforming algorithm.

FIG. 4 illustrates comparison in performance between the joint hybrid beamforming algorithm and the separate hybrid beamforming algorithm.

Referring to FIG. 4, for example, it will be assumed that $N_T^F=8$, $N_R^{RF}=4$, $N_T=2$, $N_R=1$, $M_T=16$, $M_R=4$ are applied to each of the joint hybrid beamforming algorithm and the separate hybrid beamforming algorithm. It is noted from the performance results that at a Frame Error Rate (FER)$=10^{-2}$, the joint hybrid beamforming algorithm and the separate hybrid beamforming algorithm have an SNR performance difference of about 1 dB. In other words, the separate hybrid beamforming algorithm is remarkably low in complexity than the joint hybrid beamforming algorithm, but is not significantly low in performance than the joint hybrid beamforming algorithm.

Based on this, an embodiment of the present disclosure may provide an improved hybrid beamforming algorithm method and apparatus that is low in complexity, but can keep the performance.

In an embodiment of the present disclosure, assuming that a digital precoding vector is written as Equation (6), $\|h_e\|^2$ in Equation (9) may be developed as given in Equation (10) below.

$$\|h_e\|^2=\|\Sigma_{t=1}^{N_T} p_{i,t} g_t\|^2=\Sigma_{t=1}^{N_T}\|g_t\|^2+2\cdot\Sigma_{t=2}^{N_T}\Sigma_{k=1}^{t-1} Re\{p'_{i,t} p_{i,k}(g_t^H g_k)\}=\Sigma_{t=1}^{N_T}\|g_t\|^2+2\cdot\Sigma_{t=2}^{N_T} Re\{p'_{i,t}\Sigma_{k=1}^{t-1} p_{i,k}(g_t^H g_k)\} \quad (10)$$

In Equation (10), the first term $\Sigma_{t=1}^{N_\tau}\|g_t\|^2$ is irrelevant to a digital precoding vector, and only the second term is correlated with the digital precoding vector. Therefore, the role of the digital precoding vector for maximizing $\|h_e\|^2$ in Equation (10) could arrange the channels to maximize the second term. In other words, as to a digital precoder according to an embodiment of the present disclosure, the second term may be maximized by matching the correlation (e.g., a phase value of $g_t^H g_k$ values) between virtual channel vectors transmitted from different pairs (t, k) of transmit antennas to all receive antennas, to zero (0). To this end, the above-described joint or separate hybrid beamforming algorithm may determine an optimal digital precoding vector by comparing $\|h_e\|^2$ values for all possible digital precoding vectors in a digital codebook. Therefore, the number of comparison situations may increase in proportion to the number of candidate digital precoding vectors. However, in an embodiment of the present disclosure, a digital precoder satisfying the maximum $\|h_e\|^2$ value may be estimated without the process of comparing the maximum $\|h_e\|^2$ values for given analog transmit/receive beams using Equation (11) below.

$$\|\tilde{h}_e\|^2 = \sum_{t=1}^{N_T}\|g_t\|^2 + 2\cdot\sum_{t=2}^{N_T}\left|\sum_{k=1}^{t-1} p_{i,k}(g_t^H g_k)\right| \quad (11)$$

In an embodiment of the present disclosure, in order to obtain the maximum value of the second term of Equation (10), the maximum value may be estimated without the comparison process for the number of situations for the maximum $\|h_e\|^2$ value, by changing a Re{ } function of a value determined by matching a phase value of $g_t^H g_k$ values to zero (0), to an $|\cdot|$ (amplitude) function of $g_t^H g_k$. An element value $p_{i,k}$ of a digital precoding vector included in the $|\cdot|$ function may satisfy the same conditions as Equation (6). Therefore, a phase value of $p_{i,1}=1$ for t=1, and a phase value of an optimal digital precoding vector element $p_{i,t}$ for t>1 may be determined using Equation (12) below.

$$\psi_{i,t}=\angle\{\Sigma_{k=1}^{t-1} e^{j\psi_{i,k}}(g_t^H g_k)\}, \text{ where } t>1 \quad (12)$$

Here, a value determined in previous operation using Equation (12) may be used as a $\psi_{i,t}$=(k<t) value. In summary, an embodiment of the present disclosure may estimate the maximum $\|h_e\|^2$ value, which is determined when the optimal digital precoding vector is applied, omitting the process of finding an optimal digital precoding vector using Equations (11) and (12).

Figure 5A:
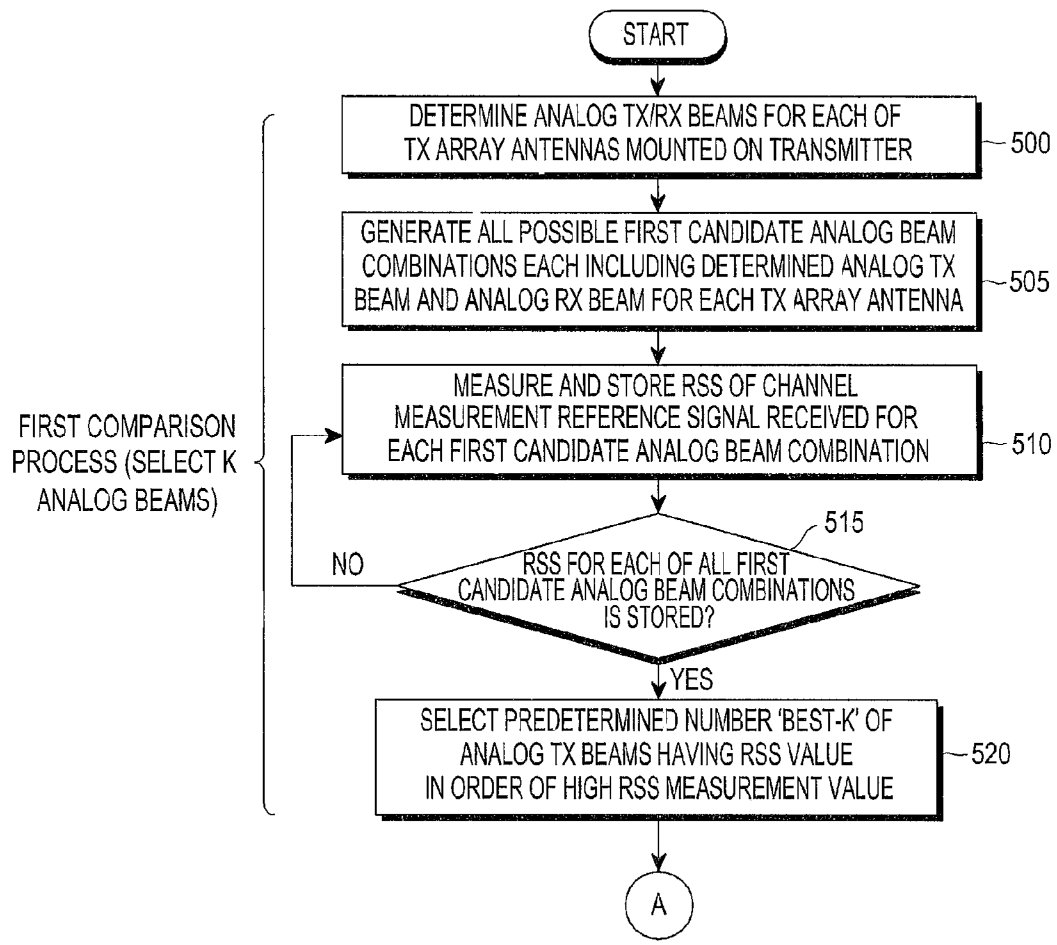
FIGS. 5A and 5B illustrate a process of a hybrid beamforming algorithm according to an embodiment of the present disclosure.
Figure 5B:
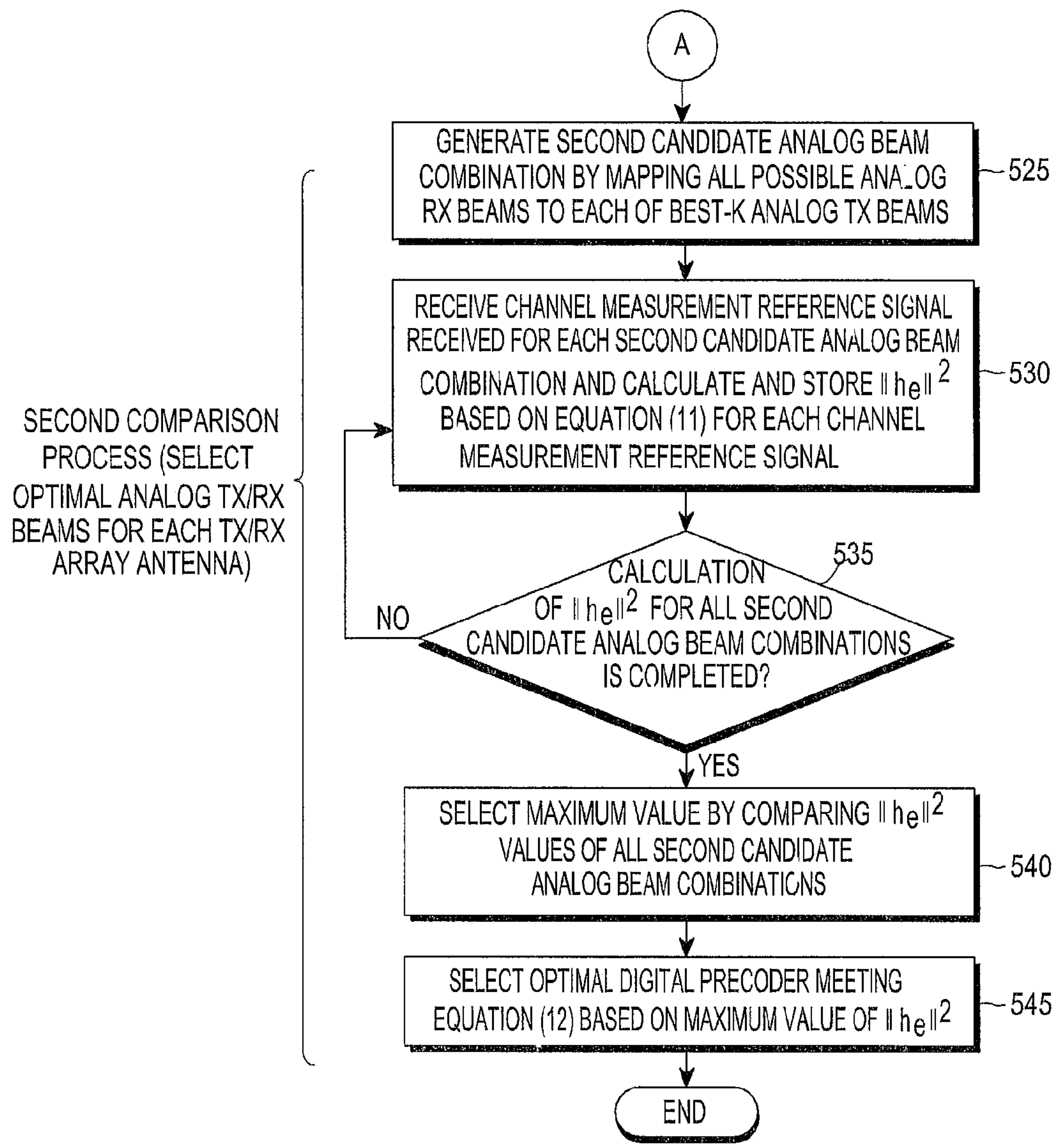

FIGS. 5A and 5B illustrate a process of a hybrid beamforming algorithm according to an embodiment of the present disclosure.

Referring to FIGS. 5A and 5B, a hybrid beamforming algorithm process according to an embodiment of the present disclosure may include two comparison processes. A first comparison process (operations 500 to 520) is a process of maximizing the first term of Equation (10), and a second comparison process (operations 525 to 545) is a process of maximizing the second term of Equation (10).

First, in the example of the first comparison process, in operation 500, a receiver may determine analog transmit beams for each of transmit array antennas mounted on a transmitter, and all possible analog receive beams that can be mapped to the analog transmit beams. For example, a system will be considered, which includes $N_T$ transmit array antennas, $M_T$ analog transmit beams for each transmit array antenna, $N_R$ receive array antennas, $M_R$ analog receive beams for each receive array antenna, and $K_{CB}$ digital precoding vectors. In operation 505, the receiver may generate a first candidate analog beam combination by mapping all possible analog receive beams to each of the determined analog transmit beams for each of the transmit array antennas. In this embodiment, the receiver may generate a total of $N_\tau \times M_\tau \times M_R^{N_R}$ analog beam combinations, like the separate hybrid beamforming algorithm.

In operation 510, the receiver may measure and store an RSS for a channel measurement reference signal received for each of all the first candidate analog beam combinations. In operation 515, the receiver may determine whether an RSS for each of all the first candidate analog beam combinations has been measured. If it is determined that RSSs for all the first candidate analog beam combinations have not been measured, the receiver may return to operation 510 and repeat the same until RSSs for all the first candidate analog beam combinations have been measured. Alternatively, if it is determined that RSSs for all the first candidate analog beam combinations have been measured, the receiver may select a predetermined number 'best-K' of analog transmit beams having an RSS value in order of high RSS measurement value, in operation 520. The number of comparison situations is $N_\tau \times M_\tau \times M_R^{N_R}$, which is the same as the number of situations corresponding to comparison operations for analog transmit/receive beam selection in FIG. 3. However, operation 320 in FIG. 3 is an operation of selecting an analog transmit beam having the greatest RSS value for each transmit array antenna, whereas operation 520 in FIG. 5A is an operation of selecting best-K analog transmit beams in order of high RSS value.

Next, in the example of the second comparison process, in operation 525, the receiver may generate a second candidate analog beam combination by mapping all possible analog receive beams to each of best-K analog transmit beams. The total number of second candidate analog beam combinations is $K^{N_\tau}$.

In operation 530, the receiver may receive a channel measurement reference signal received for each of the second candidate analog beam combinations, and calculate and store $\|h_e\|^2$ in accordance with Equation (11) for each channel measurement reference signal. In operation 535, the receiver may determine whether calculation of $\|h_e\|^2$ for all the second candidate analog beam combinations has been completed. If it is determined that calculation of $\|h_e\|^2$ for all the second candidate analog beam combinations has not been completed, the receiver may return to operation 530 and repeat the same until calculation of $\|h_e\|^2$ for all the second candidate analog beam combinations is completed. An embodiment of the present disclosure may estimate the maximum $\|h_e\|^2$ value, which is determined when the optimal digital precoding vector is selected, omitting the process of finding an optimal digital precoding vector using the above-described second comparison process.

Alternatively, if calculation of $\|h_e\|^2$ for all the second candidate analog beam combinations has been completed, the receiver may select the maximum value by comparing the calculated $\|h_e\|^2$ values of all the second candidate analog beam combinations in operation 540. In operation 545, the receiver may determine an optimal digital precoding vector using phase values of digital precoding vector element values that are determined in accordance with Equation (12), on the basis of the maximum value among the $\|h_e\|^2$ values. In this regard, it will be assumed that the receiver according to an embodiment of the present disclosure has stored a digital codebook that is determined in advance in agreement with the transmitter, and the digital codebook is designed in a DFT way like Equation (6). In an embodiment of the present disclosure, it will be assumed that a codebook that is generated in accordance with Equation (13) below is used as an example of the digital codebook.

$$p_{i,k} = \frac{1}{\sqrt{N_T}} e^{j\frac{2\pi}{N} n_{i,k}}, \quad (13)$$

where $$i = 1, \ldots , N_T,\ k = 1, \ldots , K_{CB}$$

where N denotes the number into which a phase interval having a range of 0 to 2π is evenly divided. In other words, N=4 means that the phase interval can be divided into 0°, 90°, 180° and 270°. In addition, $n_{i,k}$ may be defined as Equation (14) below.

$$n_{i,k} = \left\lfloor \frac{k-1}{N^{(N_T-1)}} \right\rfloor \bmod N \quad (14)$$

where $\lfloor x \rfloor$ denotes a floor operation meaning the largest integer that is less than x.

If it is assumed that N=16 and $N_T$=2, a digital codebook generated using Equations (13) and (14) may be expressed as Table 1 below.

TABLE 1

| Index, j | $p_{1j}$ | $p_{2j}$ |
|---|---|---|
| 1 | 1 | 1 |
| 2 | 1 | $e^{j\frac{\pi}{8}}$ |

TABLE 1-continued

| Index, j | $p_{1j}$ | $p_{2j}$ |
|---|---|---|
| 3 | 1 | $e^{j\frac{2\pi}{8}}$ |
| 4 | 1 | $e^{j\frac{3\pi}{8}}$ |
| 5 | 1 | $e^{j\frac{4\pi}{8}}$ |
| 6 | 1 | $e^{j\frac{5\pi}{8}}$ |
| 7 | 1 | $e^{j\frac{6\pi}{8}}$ |
| 8 | 1 | $e^{j\frac{7\pi}{8}}$ |
| 9 | 1 | $e^{j\pi}$ |
| 10 | 1 | $e^{j\frac{9\pi}{8}}$ |
| 11 | 1 | $e^{j\frac{10\pi}{8}}$ |
| 12 | 1 | $e^{j\frac{11\pi}{8}}$ |
| 13 | 1 | $e^{j\frac{12\pi}{8}}$ |
| 14 | 1 | $e^{j\frac{13\pi}{8}}$ |
| 15 | 1 | $e^{j\frac{14\pi}{8}}$ |
| 16 | 1 | $e^{j\frac{15\pi}{8}}$ |

Then, the receiver according to an embodiment of the present disclosure may determine an optimal digital precoding vector by performing quantization to correspond to the digital codebook that uses the phase value determined in accordance with Equation (12).

As a result, the receiver according to an embodiment of the present disclosure may perform hybrid beamforming using the second candidate analog beam combination corresponding to the maximum value of $\|h_e\|^2$, and the selected optimal digital precoder.

Figure 6:
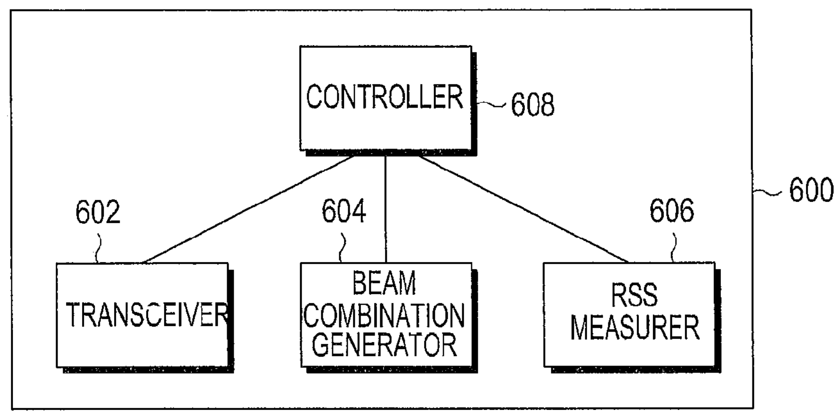
FIG. 6 illustrates a configuration of a receiver according to an embodiment of the present disclosure.

FIG. 6 illustrates a configuration of a receiver according to an embodiment of the present disclosure. The receiver, to which the hybrid beamforming algorithm according to an embodiment of the present disclosure is applicable, may be any one of portable electronic devices such as a cellular phone, a Personal Digital Assistant (PDA), a navigation device, a digital broadcasting receiver, a Personal Multimedia Player (PMP) and the like.

Referring to FIG. 6, a receiver 600 may include, for example, a transceiver 602, a beam combination generator 604, an RSS measurer 606 and a controller 608. Although the schematic configuration of the receiver 600 is illustrated herein by way of example for convenience of description, the units constituting the receiver 600 may be implemented as a single unit or separate units depending on the implementation of the operator.

The beam combination generator 604, under control of the controller 608, may generate a first candidate analog beam combination made by mapping possible transmit beams to each transmit beam for each of transmit array antennas mounted on a transmitter. Then, the RSS measurer 606, under control of the control 608, may measure an RSS of a channel measurement reference signal received through each of the first candidate analog beam combinations. Then, the controller 608 may select a predetermined number 'best-K' of analog transmit beams having an RSS value among the analog transmit beams, RSSs of which have been measured for each of the first candidate analog beam combinations, and transfer the selected analog transmit beams to the beam combination generator 604.

The beam combination generator 604 may generate a second candidate analog beam combination by mapping all possible analog receive beams to each of the best-K analog transmit beams having an RSS value. Then, the RSS measurer 606, under control of the controller 608, may measure an RSS of a channel measurement reference signal received through each of the second candidate analog beam combinations, and calculate and store $\|h_e\|^2$ in accordance with Equation (11). Then, the controller 608 may select the maximum value by comparing the calculated $\|h_e\|^2$ values of the second candidate analog beam combinations, and select a digital precoder satisfying Equation (12) based on the selected maximum value of $\|h_e\|^2$. It will be assumed that the controller 608 has stored a digital codebook corresponding to digital precoders that are represented in a DFT way like Equation (6) such that an optimal digital precoding vector may be determined by quantizing the phase value determined in accordance with Equation (12).

If the optimal digital precoding vector is determined, the controller 608 may transfer a codebook index corresponding to the optimal digital precoding vector to the transmitter through the transceiver 602.

Then, the transmitter according to an embodiment of the present disclosure may store in advance a codebook that includes codebook indexes corresponding to an angle between transmit/receive antennas. Upon receiving a codebook index determined by the receiver 600, the transmitter may determine a digital precoder corresponding to the codebook index in the codebook. In addition, the transmitter may perform data communication using the determined digital precoder.

As described above, in the hybrid beamforming algorithm according to an embodiment of the present disclosure, the total number of comparison situations used through the two types of comparison processes described in FIGS. 5A and 5B may be $N_\tau \times M_\tau \times M_R^{N_R} + K^{N_\tau}$. Therefore, the number of comparison situations according to an embodiment of the present disclosure may not be significantly different from the number $N_\tau \times M_\tau \times M_R^{N_R} + K_{CB}$ of comparison situations performed in the separate hybrid beamforming algorithm in FIG. 3. If a value of best-K is set lower in the hybrid beamforming algorithm according to an embodiment of the present disclosure, the number of comparison situations (e.g., calculation complexity) may be less than that of the separate hybrid beamforming algorithm, and the performance may approximate the performance of the ideal joint hybrid beamforming algorithm.

Figure 7:
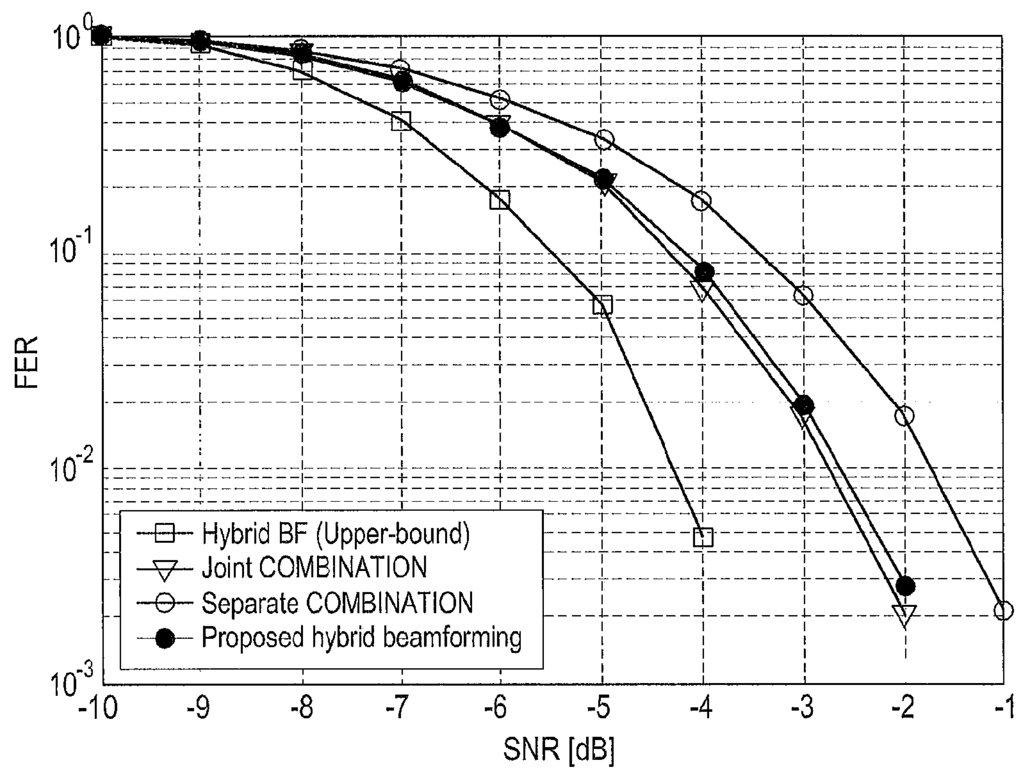
FIG. 7 illustrates a comparison in performance between a proposed hybrid beamforming algorithm and hybrid beamforming algorithms.

FIG. 7 illustrates comparison in performance between a proposed hybrid beamforming algorithm and hybrid beamforming algorithms.

Referring to FIG. 7, a situation will be considered, to which $N_T^{RF}=8$, $N_R^{RF}=4$, $N_T=2$, $N_R=1$, $M_T=16$, $M_R=4$ are applied. In this embodiment, the number of analog transmit beams, which are selected from the first candidate analog beam combinations in order of high RSS, is set to 'best-K=2'. It can be appreciated that the PER performance of the hybrid beamforming algorithm according to an embodiment of the present disclosure is almost the same as the performance of the joint hybrid beamforming algorithm.

As is apparent from the foregoing description, if the precoder selection method and apparatus for performing hybrid beamforming according to an embodiment of the present disclosure is applied, two operations of configuring and comparing transmit/receive beam combinations are performed, so a separate comparison operation of determining a digital precoder may not be performed, making it possible to reduce complexity and keep the beamforming performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to receive a signal by a receiver in a wireless communication system, the method comprising:

selecting candidate transmit beams of a plurality of transmit beams for respective transmit antennas based on received signal strengths using a plurality of beam pairs comprising the plurality of transmit beams for the respective transmit antennas of a transmitter and a plurality of receive beams for respective receive antennas of the receiver;

estimating channel values of the channels between the candidate transmit beams for the respective transmit antennas of the transmitter and the plurality of receive beams for the respective receive antennas of the receiver;

determining a transmit beam and a receive beam based on the channel values;

determining a precoder vector based on the determined transmit beam and the determined receive beam; and receiving signals based on the precoder vector via the determined transmit beam and the determined receive beam from the transmitter.

2. The method of claim 1, wherein selecting the candidate transmit beams for the respective transmit antennas comprises selecting a predetermined number of transmit beams for the respective transmit antennas in order of decreasing signal strength.

3. The method of claim 1, wherein the determining the precoder vector comprises:

determining a maximum value of the channels;

determining the transmit beam and the receive beam that correspond to a channel having the maximum value; and selecting the precoder vector by matching a correlation between channel vectors that correspond to the channel and to zero.

4. The method of claim 3, wherein the correlation corresponds to the phase value of channel values of the channel vectors transmitted from pairs of different antennas to the plurality of receive beams for the respective receive antennas.

5. The method of claim 1, further comprising:

transmitting, to the transmitter, information related to the selected precoder vector.

6. A method to transmit a signal by a transmitter in a wireless communication system, the method comprising:

transmitting a reference signal for beam information determined by a receiver;

receiving the beam information related to a precoder vector having a phase value calculated based on a transmit beam and a receive beam determined by the receiver; and transmitting signals based on the precoder vector via the transmit beam and receive beam to the receiver, wherein the transmit beam and the receive beam are determined based on channel values of channels between candidate transmit beams for respective transmit antennas and a plurality of receive beams for respective receive antennas of the receiver and estimated by the receiver, and wherein the candidate transmit beams for the respective transmit antennas are selected by the receiver based on signal strengths of signals received using a plurality of beam pairs comprising a plurality of transmit beams for the respective transmit antennas and the plurality of receive beams for the respective receive antennas.

7. The method of claim 6, wherein the candidate transmit beams for the respective transmit antennas are a predetermined number of transmit beams selected in an order of decreasing signal strength.

8. The method of claim 6, wherein the transmit beam and the receive beam corresponds to a channel having a maximum value of the channel values, and wherein the precoder vector is selected by matching a correlation between channel vectors that corresponds to the channel and to zero.

9. The method of claim 8, wherein the correlation corresponds to the phase value of channel values of the channel vectors transmitted from pairs of different transmit antennas to the plurality of receive beams for the respective receive antennas.

10. A receiver to receive a signal, the receiver comprising:

a controller configured to:

select candidate transmit beams for a plurality of transmit beams of respective transmit antennas based on received signal strength using a plurality of beam pairs comprising the plurality of transmit beams for the respective transmit antennas of a transmitter and a plurality or receive beams for respective receive antennas of the receiver, estimate channel values of channels between the candidate transmit beams for the respective transmit antennas and the plurality of receive beams for the respective receive antennas of the receiver;

determine a transmit beam and a receive beam based on the channel values; and determine a precoder vector based on the determined transmit beam and the determined receive beam; and a transceiver configured to receive signals based on the precoder vector via the determined transmit beam and the determined receive beam from the transmitter.

11. The receiver of claim 10, wherein the controller is configured to select a predetermined number of transmit beams for the respective transmit antennas in order of decreasing signal strength.

12. The receiver of claim 10, wherein the controller is configured to:

determine a maximum value of the channel values;

determine the transmit beam and the receive beam that correspond to the channel having the maximum value; and select the precoder vector by matching a correlation between channel vectors that correspond to the channel and to zero.

13. The receiver of claim 12, wherein the correlation corresponds to the phase value of channel values of the channel vectors transmitted from pairs of different transmit antennas to the plurality of receive beams for the respective receive antennas.

14. The receiver of claim 10, wherein the transceiver, under control of the controller, is configured to transmit, the transmitter, information related to the selected precoder vector.

15. A transmitter to transmit a signal, the transmitter comprising:

a transmitter configured to transmit a reference signal for beam information determined by a receiver;

a receiver configured to receive the beam information related to a precoder vector having a phase value calculated based on a transmit beam and a receive beam determined by the receiver; and a controller configured to control the transmitter to transmit signals based on the precoder vector via the transmit beam and the receive beam to the receiver, wherein the transmit beam and the receive beam are determined based on channel values of channel between candidate transmit beams for respective transmit antennas and a plurality of receive beams for respective receive antennas of the receiver and estimated by the receiver, and wherein the candidate transmit beams for the respective transmit antennas are selected by the receiver based on signal strengths of the signals received using a plurality of beam pairs comprising a plurality of transmit beams for the respective transmit antennas and the plurality of receive beams for the respective receive antennas.

16. The transmitter of claim 15, wherein the candidate transmit beams for the respective transmit antennas are a predetermined number of transmit beams selected in order of decreasing signal strength.

17. The transmitter of claim 16, wherein the transmit beam and the receive beam correspond to a channel having a maximum value of the channel values, and wherein the precoder vector is selected by matching a correlation between channel vectors that correspond to the channel and to zero.

18. The transmitter of claim 17, where the correlation corresponds to the phase value of channel values of the channel vectors transmitted from pairs of different transmit antennas to the plurality of receive beams for the respective receive antennas.

* * * * *